United States Patent
Guha et al.

(10) Patent No.: US 10,538,278 B2
(45) Date of Patent: Jan. 21, 2020

(54) TWO PIECE BONDED ASSEMBLY VEHICLE COMPONENTS

(71) Applicant: CONTINENTAL STRUCTURAL PLASTICS, INC., Auburn Hills, MI (US)

(72) Inventors: Probir Kumar Guha, Auburn Hills, MI (US); Michael Siwajek, Auburn Hills, MI (US); Michael J. Hiltunen, Auburn Hills, MI (US); Shane Skop, Auburn Hills, MI (US); Satish Haryadi, Auburn Hills, MI (US)

(73) Assignee: Continental Structural Plastics, Inc., Auburn Hills, MI (US)

( * ) Notice: Subject to any disclaimer, the term of this patent is extended or adjusted under 35 U.S.C. 154(b) by 557 days.

(21) Appl. No.: 14/901,650

(22) PCT Filed: Jun. 26, 2014

(86) PCT No.: PCT/US2014/044341
§ 371 (c)(1),
(2) Date: Dec. 28, 2015

(87) PCT Pub. No.: WO2014/210310
PCT Pub. Date: Dec. 31, 2014

(65) Prior Publication Data
US 2016/0152283 A1 Jun. 2, 2016

Related U.S. Application Data

(60) Provisional application No. 61/839,434, filed on Jun. 26, 2013.

(51) Int. Cl.
*B62D 29/04* (2006.01)
*B62D 25/10* (2006.01)
*B32B 7/12* (2006.01)

(52) U.S. Cl.
CPC .............. *B62D 29/043* (2013.01); *B32B 7/12* (2013.01); *B62D 25/105* (2013.01);
(Continued)

(58) Field of Classification Search
CPC ................ B62D 29/043; B62D 25/105; B29C 66/73112; B29C 66/7212; B29C 66/112;
(Continued)

(56) References Cited

U.S. PATENT DOCUMENTS 6,729,676 B1   5/2004   O'Hara et al.
7,655,297 B2   2/2010   Guha et al.
(Continued)

FOREIGN PATENT DOCUMENTS

CN       2838950 Y    11/2006
CN     203713981 U     7/2014
(Continued)

OTHER PUBLICATIONS

Machine Translation of CN 2838950 Y. (Year: 2006).*
(Continued)

*Primary Examiner* — Brian Handville
(74) *Attorney, Agent, or Firm* — Blue Filament Law PLLC

(57) ABSTRACT

A vehicle component is provided that includes a first cured layer of a molding composition having a predominant fiber filler chopped glass fibers, a second cured layer of molding composition having a predominant fiber filler chopped carbon fibers, and a bonding agent with elongation properties configured to accommodate the differential coefficients of linear thermal expansion between the first cured layer and the second cured layer. The second cured layer is substantially devoid of glass fiber. The bonding agent is an elastomeric adhesive, which is operative from −40 to 205° C. The first cured layer forms an outer skin layer surface of a
(Continued)

vehicle and the second cured layer forms an interior layer, where the outer skin layer surface has a class-A finish.

14 Claims, 3 Drawing Sheets

(52) U.S. Cl.
CPC ... *B32B 2262/101* (2013.01); *B32B 2262/106* (2013.01); *B32B 2605/00* (2013.01)

(58) Field of Classification Search
CPC . B29C 66/131; B29C 66/54; B29C 66/73756; B29C 65/48; B29C 70/18; B29C 66/71; B29C 65/483; B32B 7/12; B32B 2262/106; B32B 2262/101; B32B 2605/00; B29K 2233/08; B29K 2307/04; B29L 2031/3055; B29L 2031/30; B29L 2031/3044
See application file for complete search history.

(56) References Cited

U.S. PATENT DOCUMENTS

| | | | |
|---|---|---|---|
| 7,997,642 | B2 | 8/2011 | Rocheblave et al. |
| 2004/0045595 | A1* | 3/2004 | Makita ............... F24J 2/5237 136/244 |
| 2005/0236736 | A1 | 10/2005 | Formella et al. |
| 2005/0239357 | A1 | 10/2005 | Wesch et al. |
| 2007/0238378 | A1 | 10/2007 | Conover et al. |
| 2009/0056868 | A1 | 3/2009 | Basu et al. |
| 2010/0112881 | A1* | 5/2010 | Bahukudumbi ......... D04H 1/54 442/1 |
| 2010/0116407 | A1 | 5/2010 | Brentrup et al. |
| 2010/0174031 | A1 | 7/2010 | Marks et al. |
| 2012/0003454 | A1 | 1/2012 | Younes et al. |
| 2012/0193015 | A1 | 8/2012 | Segal et al. |
| 2014/0199551 | A1 | 7/2014 | Lewit |

FOREIGN PATENT DOCUMENTS

| | | |
|---|---|---|
| ES | 2498374 T3 | 9/2014 |
| FR | 2907078 | 4/2008 |
| JP | H08323924 A | 12/1996 |

OTHER PUBLICATIONS

Search Report for International Application No. PCT/US2014/044341 filed Jun. 26, 2014.
Extended European Search Report dated Jan. 31, 2017 for International Application No. PCT/US2014/044341 filed Jun. 26, 2014.
"Plastic Omnium Rapport Activite 2013"; 1, rue du Parc—92593 Levallois Cedex—France, Tel.: 33 (0)1 40 87 64 00, www.plasticommium.com; Compaignie Plastic Omnium, Societe anonyme au capital de 9298621 euros, Siege social: 19, avenue Jules Carteret—69007 Lyon—France, RCS: Lyon 955 512 611—APE: 6420 Z (Downloaded in 4 parts).

* cited by examiner

TWO PIECE BONDED ASSEMBLY VEHICLE COMPONENTS

RELATED APPLICATIONS

This application claims priority benefit of U.S. Provisional Application Ser. No. 61/839,434 filed Jun. 26, 2013; the contents of which are hereby incorporated by reference.

FIELD OF THE INVENTION

The present invention in general relates to vehicle construction and in particular, to two-piece vehicle components formed with at least two layers: one of the layers reinforced predominantly with chopped and dispersed glass fibers, and a second layer predominantly reinforced with carbon fibers, the separate layers being joined after resin cure to form the component.

BACKGROUND OF THE INVENTION

The use of fiber inclusions to strengthen a matrix is well known to the art. Well established mechanisms for the strengthening of a matrix include slowing and elongating the path of crack propagation through the matrix, as well as energy distribution associated with pulling a fiber free from the surrounding matrix material. In the context of sheet molding composition (SMC) formulations, bulk molding composition (BMC) formulations, and resin transfer molding (RTM) fiber strengthening has traditionally involved usage of chopped glass fibers. There is a growing appreciation in the field of molding compositions that replacing in part, or all of the glass fiber in molding compositions with carbon fiber can provide improved component properties; however, technical problems remain that include disparate layer joinder, fiber flow, fiber surface energies, and surface quality of the resultant component.

The use of carbon fibers in composites, sheet molding compositions, and resin transfer molding (RTM) results in formed components with a lower weight as compared to glass fiber reinforced materials. The weight savings achieved with carbon fiber reinforcement stems from the fact that carbon has a lower density than glass and produces stronger and stiffer parts at a given thickness.

Weight savings in the auto, transportation, and logistics based industries has been a major focus in order to make more fuel efficient vehicles both for ground and air transport. Weight savings using carbon reinforced composites in vehicle parts has helped these industries achieve meaningful weight savings. However, high quality surface finishes, such as a class-A surfaces in the auto industry that are characterized by a high surface sheen, are generally obtained only with highly tailored resin formulations that contain glass fibers, such as TCA® resins commercially available from Continental Structural Plastics, Inc. used in SMC or RTM, or metals such as aluminum and alloys thereof. Class-A surfaces are generally required for vehicle surface panels: doors, hoods, quarter panels, trunks, roof structures, bumpers, etc., which make up a significant amount of weight in a vehicle.

Thus, there exists a need for a process and design to utilize carbon reinforced parts for vehicle surface panels.

SUMMARY OF THE INVENTION

A vehicle component includes a first cured layer of a molding composition having a predominant fiber filler chopped glass fibers, a second cured layer of molding composition having a predominant fiber filler chopped carbon fibers, and a bonding agent with elongation properties configured to accommodate the differential coefficients of linear thermal expansion between the first cured layer and the second cured layer. The second cured layer is substantially devoid of glass fiber, and is formed from one of: bulk molding composition (BMC), sheet molding composition (SMC), or resin transfer molding (RTM). At least one of the first cured layer or the second cured layer includes a minority percentage by total fiber weight of a natural fiber. The first cured layer is an outer panel that forms an outer skin layer surface of a vehicle with a class-A finish. The second cured layer is an inner reinforcement panel. The bonding agent is an elastomeric adhesive that is operative from −40 to 400° F. (−40 to 205° C.).

The vehicle component may include at least one additional layer of a third cured layer of a molding composition having a predominant fiber filler chopped glass fibers and a fourth cured layer of molding composition having a predominant fiber filler chopped carbon fiber; and a second layer of bonding agent joining the at least one additional layer to one of the first cured layer or the second cured layer to form a laminate.

BRIEF DESCRIPTION OF THE DRAWINGS

The present invention is further detailed with respect to the following drawings that are intended to show certain aspects of the present invention, but should not be construed as a limit on the practice of the present invention.

DESCRIPTION OF THE INVENTION

Figure 1A:
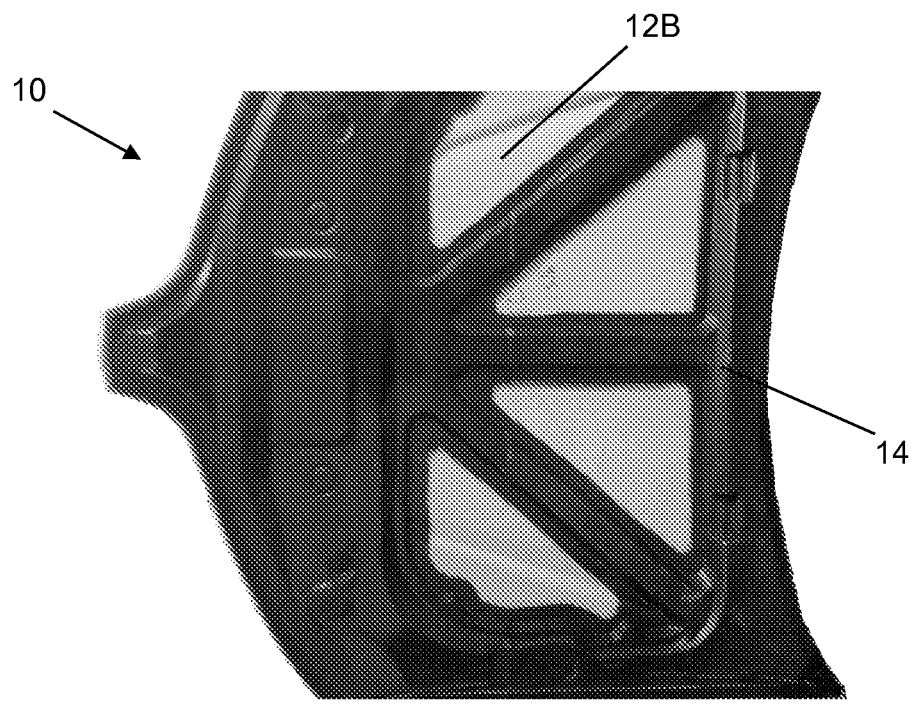
FIGS. 1A-1C are perspective views of a two-piece vehicle hood with an outer layer of glass fiber reinforced class-A sheet material, and an inner layer of carbon fiber reinforced sheet molding compositions or carbon reinforced resin transfer molding (RTM) according to embodiments of the invention.

The present invention has utility in the formation of two-piece vehicle components that are reinforced with chopped and dispersed glass fibers in one cured layer and a joined second cured layer reinforced with dispersed carbon fibers. While the present invention is detailed herein as relating to a two-piece construction, it should be appreciated that the two-piece structure described herein is readily repeated to create a multiple layer laminate. By way of example, a predominantly glass fiber filled outer skin layer is joined to opposing surfaces of a core predominantly carbon fiber filled core layer; vice versa; or a series of alternating predominantly fiber filled layers are joined with a pattern A-B-A . . . B. In certain inventive embodiments, a cured inner portion of molding composition is reinforced predominantly with chopped carbon fibers is joined to a cured outer skin of a second sheet molding composition reinforced predominantly with glass fiber, where the outer surface has an automotive surface quality finish, such as a class-A finish. As used herein, a class-A surface finish is associated with a surface shine and reflectivity required for exterior body panels by automotive manufacturers. In an embodiment, the cured inner portion is substantially devoid of glass fiber, while the outer skin is substantially devoid of chopped carbon fiber.

As used herein "molding compositions" refers to SMC, BMC and RTM resin formulations that are amenable to loading with chopped fibers of glass or carbon.

In a particular inventive embodiment, carbon fibers in a molding composition are present in an inner layer of a vehicle component containing from 10 to 40% by weight carbon fibers of the inner layer, with an outer skin layer of SMC based on the commercially available TCA® (Continental Structural Plastics, Inc.) containing glass fiber containing between 10 and 60% glass fiber by weight of the TCA® portion, as embodied in U.S. Pat. No. 7,655,297. The ratio of thickness of the inner portion to the outer skin ranges from 01-10:1. The resulting SMC inner portion layer and outer skin layer are laid out, formed, and cured separately and the two layers joined thereafter to form a component. Such a two-piece component with an inner layer containing carbon fibers is noted to have a density that is 10, 20, 30 and even 40% lower than the comparable article formed wholly from TCA® or other class A surface finish resin. In this way a lightweight article is formed that retains the high surface gloss of a class-A surface. It is appreciated that a given layer, can include both carbon fibers and glass fibers in combination, as well as other types of fibers such as natural cellulosic fibers that illustratively include coconut fibers with the proviso the loading of other types of fibers is limited such that glass fibers are predominantly present in a first layer and carbon fibers are predominantly present in a second layer. The predominant presence of a given type of fiber is used herein to mean that the fiber type represents more than 50% by weight of the total weight of fibers present in the layer. In certain embodiments, each layer is 100% of a given type of fiber, while in other embodiments the predominant fiber is present between 51 and 99%.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

In another inventive embodiment, carbon fibers are dispersed in a methyl methacrylate monomer based molding composition. Other suitable monomers from which a molding composition formulation is produced illustratively include unsaturated polyesters, epoxies, and combinations thereof. A molding composition formulation based on epoxy illustratively includes bis-phenol-A and Novolac based 5 epoxy terminated resins. Suitable curing agents for such an epoxy based molding composition formulation illustratively include anhydrides such as trimellitic anhydride, methyl tetrahydrophthalic anhydride (MTHPA), nadic methyl anhydride (NMA), di- and tri-functional amines, and combinations thereof.

In another inventive embodiment of the present invention, carbon fibers are dispersed in a molding composition monomer or solution containing monomer with a relative polarity of greater than 0.26, and in certain embodiments greater than 0.5, and in still other embodiments between 0.5 and 0.8. Relative polarity is defined per Christian Reichardt, Solvents and Solvent Effects in Organic Chemistry, Wiley-VCH, 3rd edition, 2003.

In another inventive embodiment, the carbon fibers are dispersed in molding composition formulations prior to cure resulting in a reinforced SMC, BMC or RTM cured article that has a lower density overall, and a lower percentage by weight loading of fibers, as compared to a like layer formed with glass fiber reinforcement. Additionally, through the use of coupling agents superior tensile strength is achieved.

In certain inventive embodiments, heat is applied under suitable atmospheric conditions to remove any sizing or other conventional surface coatings on the surface of the carbon fibers prior to contact with a molding composition that upon cure forms a matrix containing the carbon fibers. In still other inventive embodiments heat is applied under an inert or reducing atmosphere to promote pyrolysis of the sizing from the core carbon fibers. It is appreciated that recycled carbon fiber is operative in an inventive two-piece vehicle component.

As carbon dissipates heat much better than glass as known from the respective coefficients of linear thermal expansion (CLTE), a predominantly carbon fiber filled layer cools more quickly than an otherwise like layer predominantly glass fiber filled. This difference in dynamic cooling after cure is compounded for thinner carbon fiber filled layers making them especially prone to warpage. Therefore, due to the differences in CTLE and material stiffness between the predominantly glass fiber filled layer and predominantly carbon filled layer, joining bonding agents must have exceptional elongation ability to compensate for the differential CTLE of the joined layers over the temperature range of −40 to 140° F. (−40 to 60° C.), and even as high as 400° F. (205° C.) associated with cure conditions and hot joinder of layers. In specific inventive embodiments, elastomeric bonding agents may be used to bond the inner layer to the outer layer. Elastomeric bonding agents operative herein to join disparate layers of an inventive component illustratively include urethanes, epoxies, and a combination thereof. In certain inventive embodiments, the bonding flange thickness is increased from ¼-½ inch (0.63-1.27 cm) for joining like fiber filler layers together to 1-1.5 inches (2.54-3.81 cm) for the inventive two-piece construction.

Figure 1B:
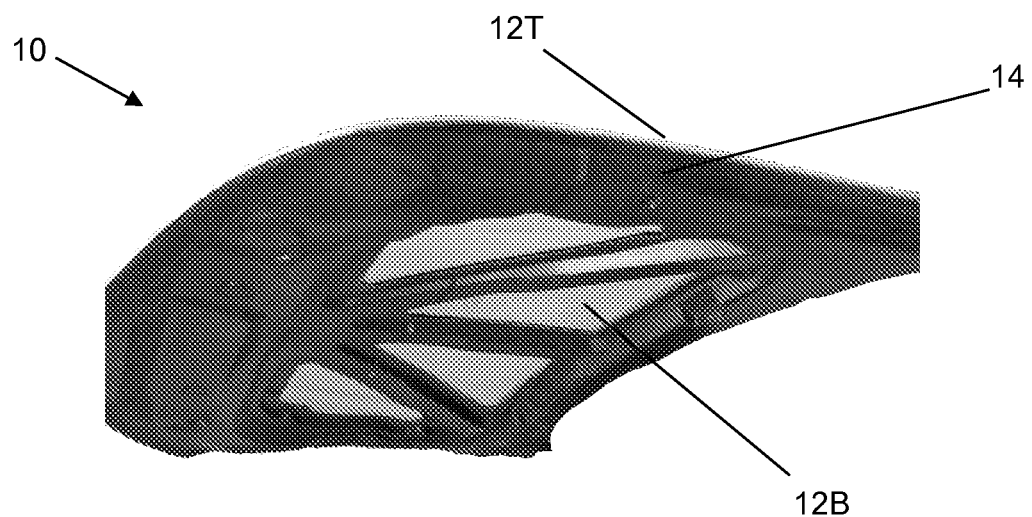
Figure 1C:
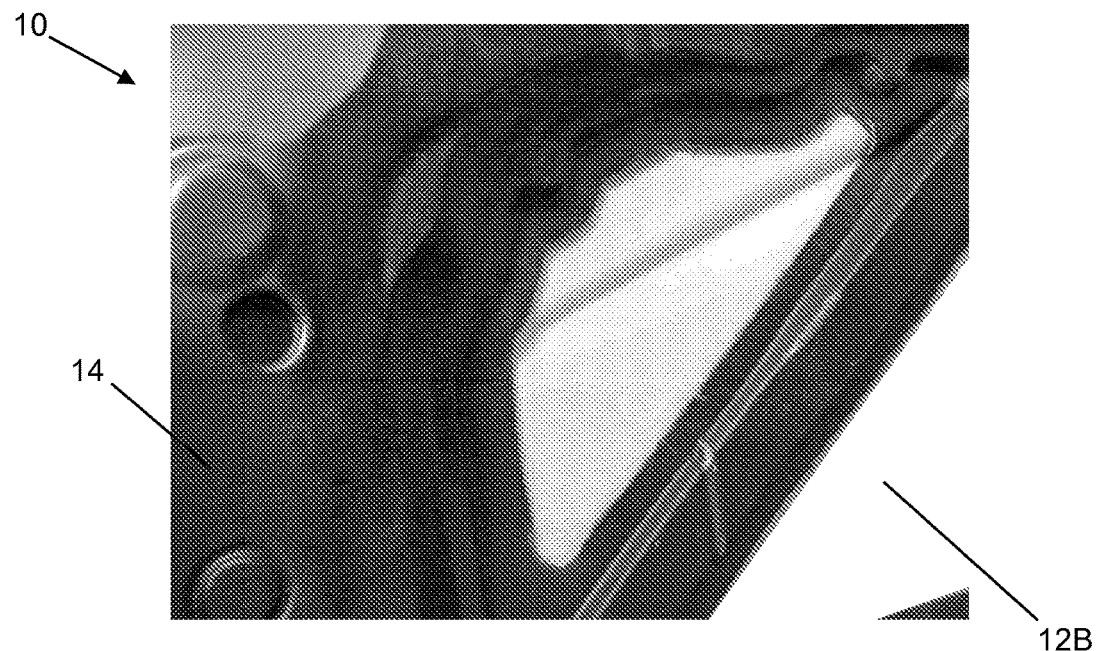

Referring now to FIGS. 1A-1C, an inventive two-piece component forms as a vehicle hood 10 is shown with an outer layer 12 of predominantly glass fiber reinforced class-A sheet material, and an inner layer 14 of predominantly carbon fiber reinforced sheet molding compositions. As shown, the outer layer 12 has a top portion 12T that is exposed as the outer finished surface of the vehicle, and a bottom portion 12B that is bonded to inner layer 14. The top portion 12T is amenable to sanding and painting to achieve a class-A or similar high luster surface finish associated with a new vehicle exterior. Typical thickness of layers 12 and 14 in FIGS. 1A-1C are 2.5-2.7 millimeters (mm) and 1-2 mm, respectively. As noted above, it is appreciated that layers are joined to form more complex laminated of a cross-sectional ordering that illustratively include 12-14-12, 12-14-12-14, 12-14-(12-14)$_n$ . . . 12 and 12-14-(12-14)$_n$, where n is an integer of n or more. It should also be appreciated that the thickness of layers 12 and 14 are variable depending on the desired strength and the overall laminate thickness so as to have values beyond the typical values provided above.

Figure 2:
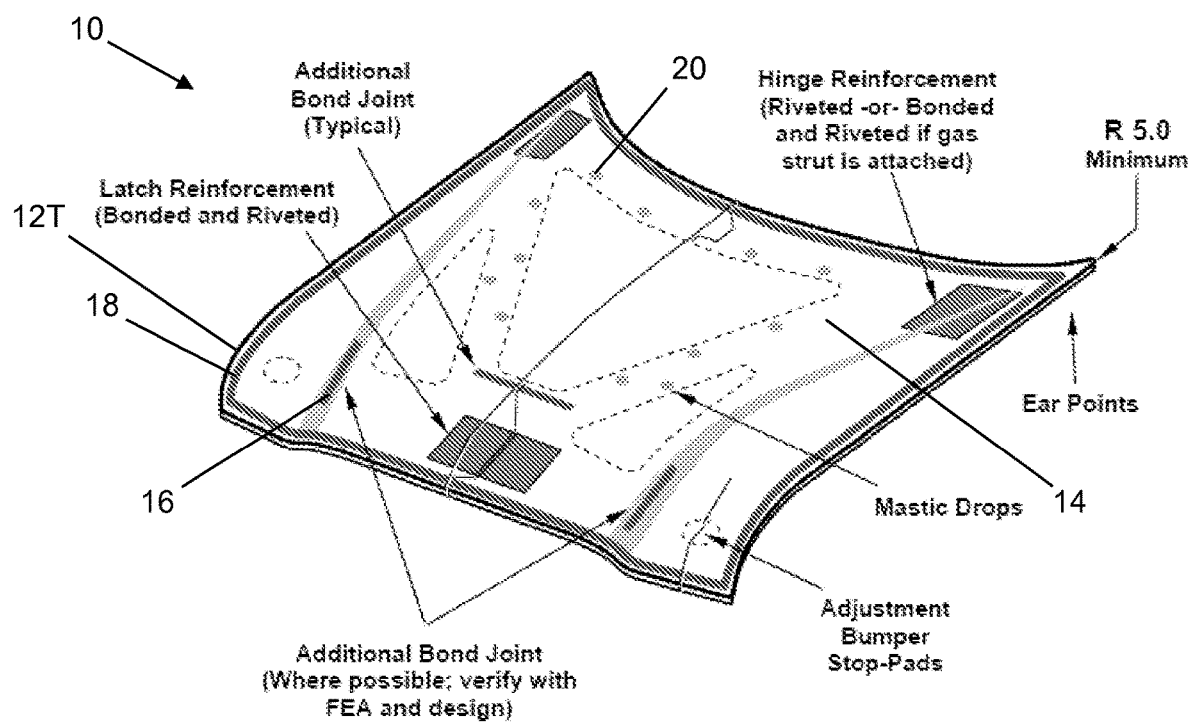
FIG. 2 shows the vehicle hood of FIGS. 1A-1C formed with a glass fiber reinforced finished surface outer panel (see-thru surface) bonded at multiple points to a carbon fiber reinforced structural inner panel according to embodiments of the invention.

FIG. 2 shows the component 10 of FIG. 1 formed with a predominantly glass fiber reinforced finished surface outer layer 12 (shown as transparent for visual clarity) bonded at multiple points to a predominantly carbon fiber reinforced structural inner panel 14 according to embodiments of the invention. The inner layer 14 is bonded at various joints 16, or along a layer perimeter 18. Additionally, mastic drops 20 may provide spot adhesive bonding to modify joinder properties.

Figure 3:
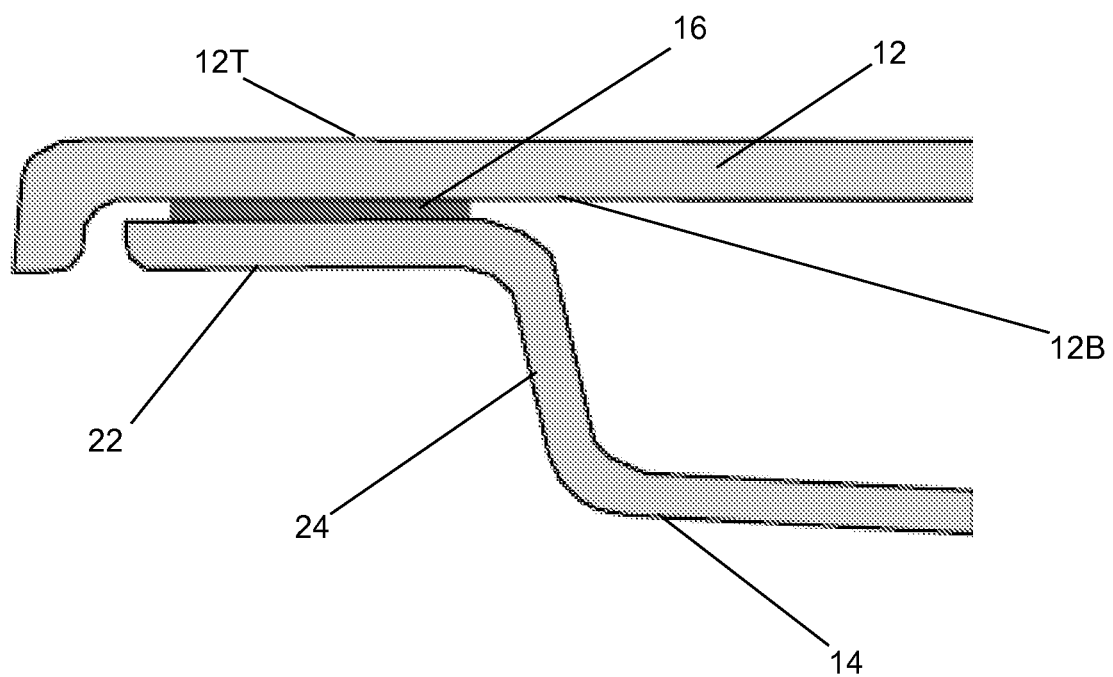
FIG. 3 is a cross section of a typical body panel seal flange where the glass fiber based class A outer panel is bonded (adhesive, epoxy, etc.) or secured at a bond flange of the carbon fiber based structural inner panel according to embodiments of the invention.

FIG. 3 is a cross section of a typical body panel seal flange where the glass fiber based class A outer layer 12 is bonded 16 (adhesive, epoxy) or secured at a bond flange 22 of the carbon fiber based structural inner layer 14 according to embodiments of the invention. Vehicles are generally constructed around a frame, where a vehicle has finished surface panels that are secured or bonded to substructures to form body panels that are designed for attachment to the irregular surfaces of the frame. The bond flange 22 follows a corresponding seal carrying surface. The "hat" section 24 of the structural inner panel 14 extends to reach and attach to the frame (not shown).

The foregoing description is illustrative of particular embodiments of the invention, but is not meant to be a limitation upon the practice thereof. The following claims, including all equivalents thereof, are intended to define the scope of the invention.

The invention claimed is:

1. A vehicle component consisting of:
    a first cured layer of a molding composition having a fiber filler of chopped glass fibers, the chopped glass fibers present in said first cured layer from 10 to 60% by weight of said first cured layer;
    a second cured layer of molding composition having a fiber filler of chopped carbon fibers, the chopped carbon fibers present in said second cured layer from 10 to 40% by weight of said second cured layer; and
    a bonding agent with elongation properties configured to accommodate the differential coefficients of linear thermal expansion between said first cured layer and said second cured layer;
    wherein said first cured layer is an outer panel and said second cured layer is an inner reinforcement panel defining at least one cut-out such that a portion of a bottom surface of said first cured layer is exposed; and
    wherein said vehicle component optionally includes a bonding flange.

2. The vehicle component of claim 1 wherein said second cured layer is devoid of glass fiber.

3. The vehicle component of claim 1 wherein said bonding agent is operative from −40 to 205° C.

4. The vehicle component of claim 1 wherein said bonding agent is an elastomeric adhesive.

5. The vehicle component of claim 1 wherein said bonding flange has a thickness of between 2.54-3.81 cm.

6. The vehicle component of claim 1 wherein said second cured layer is formed from one of: bulk molding composition (BMC), sheet molding composition (SMC), or resin transfer molding (RTM).

7. The vehicle component of claim 1 wherein at least one of said first cured layer or said second cured layer comprises a minority percentage by total fiber weight of a natural fiber.

8. The vehicle component of claim 1 wherein said first cured layer is an outer panel.

9. The vehicle component of claim 1 wherein said second cured layer is an inner reinforcement panel.

10. The vehicle component of claim 1 wherein said first cured layer forms an outer skin layer surface of a vehicle and said second cured layer forms an interior layer.

11. The vehicle component of claim 10 wherein the outer skin layer surface has a class-A finish.

12. The vehicle component of claim 10 wherein said interior layer has an inner layer thickness and said outer skin layer has an outer skin thickness and the ratio of the inner layer thickness to outer skin thickness is between 1-10:1.

13. The vehicle component of claim 1 wherein said molding composition is a class A surface finish resin.

14. The vehicle component of claim 1 wherein said first cured layer devoid of chopped carbon fiber.

* * * * *